(12) United States Patent
Suzuki et al.

(10) Patent No.: US 6,320,625 B1
(45) Date of Patent: Nov. 20, 2001

(54) CONTOUR EMPHASIZING CIRCUIT

(75) Inventors: Susumu Suzuki; Masanori Kurita, both of Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/402,025

(22) PCT Filed: Mar. 25, 1997

(86) PCT No.: PCT/JP97/00995

§ 371 Date: Sep. 24, 1999

§ 102(e) Date: Sep. 24, 1999

(87) PCT Pub. No.: WO98/43410

PCT Pub. Date: Jan. 10, 1998

(51) Int. Cl.[7] .................................................. H04N 5/208
(52) U.S. Cl. ........................................ 348/625; 348/630
(58) Field of Search ................................... 348/625, 630, 348/627, 628, 629, 631; 382/266; H04N 5/21, 5/208

(56) References Cited

U.S. PATENT DOCUMENTS 5,767,900 * 6/1998 Tanji ..................................... 348/625

FOREIGN PATENT DOCUMENTS

| 62-154892 | 7/1987 | (JP) . |
| 1-259464 | 10/1989 | (JP) . |
| 8-23544 | 1/1996 | (JP) . |
| 8-65548 | 3/1996 | (JP) . |
| 8-163412 | 6/1996 | (JP) . |
| 8-186739 | 7/1996 | (JP) . |

* cited by examiner

Primary Examiner—Sherrie Hsia
(74) Attorney, Agent, or Firm—Flynn, Thiel, Boutell & Tanis, P.C.

(57) ABSTRACT

Since A/D conversion circuits 30r, 30g and 30b to convert for output analog R, G and B signals to digital signals, a phase adjustment circuit 31 to output by delaying in the portion of 1 linc output signals of these A/D conversion circuits 30r, 30g and 30b, a first signal generation circuit 35 to generate Y signals from output signals of A/D conversion circuits 30r, 30g and 30b, a second Y signal generation circuit 37 to generate a Y signal from an output signal of the phase adjustment circuit 31, a contour extracting circuit 39 to extract a vertical contour component and a horizontal contour component from Y signals generated by first and second Y signal generation circuits, and contour adders 34r, 34g and 34b to output signals contour-emphasized adding a vertical contour component and a horizontal contour component extracted by this contour extracting circuit 39 to output signals of the phase adjustment circuit are provided, and since it has been designed that the contour extracting 39 extracts a vertical contour component and a horizontal contour component from Y signals generated by first and second Y signal generation circuits 35 and 37, provided the line memory ncccssary for the contour extracting circuit 39 is made as 1 picce, the power consumption can be made smaller, as well the cost can be loared.

5 Claims, 7 Drawing Sheets

(a) A/D conversion when large signal is input (b) A/D conversion when contour emphasizing quantity is "large"

# CONTOUR EMPHASIZING CIRCUIT

TECHNICAL FIELD

The present invention relates to a contour emphasizing circuit, wherein a digital contour-emphasized video signal on the basis of the input of an analog signal is output, and is employed to indicate contour-emphasized color video signals by a display device (for example, matrix type display device) which is digitally driven such as a plasma display (referred only to as PDP) and liquid crystal display (referred only to as LCD).

BACKGROUND ART

In conventional CRT (Cathode Ray Tube) display devices, the contour emphasizing processing is carried out aiming at high picture quality implementation and high-pass characteristic compensation. The contour emphasizing circuit to carry out this contour emphasizing processing is, as shown in FIG. 1, composed of a Y/C separation circuit 10, a color demodulation circuit 12, a contour extracting circuit, phase adjustment circuits 16, 18 and 20, an adder 22 and a matrix circuit 24.

The Y/C separation circuit 10 separates a Y (luminance) signal and a C (color) signal from the composite video signal (for example, compound color television signal) input to an input terminal 26, and the color modulation circuit 12 separates a Y signal, an R−Y (color difference) signal and a B−Y (color difference) signal on the basis of a Y signal and a C signal.

The contour extracting circuit 14 extracts the contour component Ye which is a high-pass component of a video signal on the basis of an adder 22.

The matrix circuit 24 prepares a signal adding the contour component Ye to the R (red), G (green) and B (blue) signals, respectively, on the basis of (Y+Ye) signals added by the adder 22, an (R−Y) and a (B−Y) signal phase-adjusted by phase adjustment circuits 18 and 20. That is to say, the matrix circuit 24 prepares R+Ye, G+Ye and B+Ye on the basis of the operations in the following equations (1), (2) and (3). By outputting these R+Ye, G+Ye and B+Ye to the CRT display device by means of output terminals 28r, 28g and 28b, videos contour-emphasized by this CRT display device are displayed.

$$(R-Y)+(Y+Ye)=R+Ye \quad (1)$$

$$(G-Y)+(Y+Ye)=G+Ye \quad (2)$$

$$(B-Y)+(Y+Ye)=B+Ye \quad (3)$$

(G−Y) in the above equation (2) is generated by the following equation (4).

In case a video contour-emphasized by the matrix type display device driven by digital video signals (for example, R, G and B signals) like PDP and LCD is displayed, each signal of (R+Ye), (G+Ye) and (B+Ye) obtained in output terminals 28r, 28g and 28b in FIG. 1 is output to the display device after being digitized by the A/D (analog/digital) conversion circuit. However, in such a prior example, in case a large amplitude signal is input to an input terminal 26, or in case the contour emphasizing quantity (or contour emphasizing coefficient, the description is omitted, as it is similar afterwards) is "large", there is a problem that the correct operation cannot be obtained over the dynamic range of the A/D conversion circuit.

For example, in case a large amplitude signal is input to the input terminal 26, by outputting a signal over the dynamic range of the A/D conversion circuit as shown at the left-hand side in FIG. 2(a) from output terminals 28r, 28g and 28b, there are problems that signals exceeding an upper conversion reference voltage value VRT (for example, 5 volts) in the dynamic range as shown at the right-hand in said figure (a) are cut, resulting in producing white crushing or signals under the lower conversion reference voltage value VRT (for example, 3 volts) in the dynamic range are cut, resulting in producing black crushing.

Further, in case the contour emphasizing quantity of the contour extracting circuit 14 is "large", there are problems that signals over the dynamic range of the A/D conversion circuit as shown at the left-hand side in FIG. 2(b) are cut, resulting in producing white crushing or signals under the lower conversion reference voltage value VRB are cut, resulting in producing black crushing.

The present applicant simultaneously proposes a contour emphasizing circuit as shown in FIG. 3 as a separate application to solve the above mentioned problems.

This contour emphasizing circuit shown in FIG. 3 is constituted by A/D conversion circuits 30r, 30g and 30b, a phase adjustment circuit 31 composed of line memories 31r, 31g and 31b, a signal processing circuit 32, contour adders 34r, 34g and 34b, a Y signal generation circuit 36, a contour extracting circuit 38, a gain controller 40 for the contour components and a coefficient multiplication circuit 42.

The contour extracting circuit 38 is constituted by first and second line memories 48 and 50, a vertical contour extracting circuit 52, a contour emphasizing frequency setting circuit 54, a horizontal contour extracting circuit 56, a contour synthesis circuit 62, a core ring circuit 64 and a gain controller 66.

Hence, analog R, G and B signals input to input terminals 44r, 44g and 44b are converted to digital signals by A/D conversion circuits 30r, 30g and 30b, phase-adjusted by the phase adjustment circuit 31, signal-processed by the signal processing circuit 32 and input to contour adders 34r, 34g and 34b. The Y signal generation circuit 36 generates Y signals from digital R, G and B signals, the contour extracting circuit 38 extracts contour components from Y signals, these contour components extracted are input to contour adders 34r, 34g and 34b through the gain controller 40 and the coefficient multiplication circuit 42, are added to original digital R, G and B signals, and supplied to the display device through output terminals 86r, 86g and 86b.

As described above, it has been designed by adding the contour components after converting the analog R, G and B signals to digital signals by A/D conversion circuits 30r, 30g and 30b, contour emphasizing components, unlike conventional examples, do not surpass the dynamic range of A/D conversion circuit. For this reason, when analog color video signals input to input terminals 44r, 44g and 44b of the contour emphasizing circuit in FIG. 3 are large amplitude signals, or even when the contour emphasizing quantity is "large", neither white crushing nor black crushing is produced when outputting digital R, G and B signals from the contour emphasizing circuit in FIG. 3 to the display device driven by digital video signals and displaying a contour emphasizing video.

However, since the contour extracting circuit 38 requires two line memories of first and second line memories 48 and 50, the contour emphasizing circuit shown in FIG. 3 had the following problems as shown in (a), (b) and (c).

(a) Since the line memory requires a number of gates (for example, when the memory capacity is of 1024×8 bits in the line memory, approximately 12,700 more or less), there is a problem that in proportion as the power consumption is made large, the cost comes to be high.

(b) In case it is realized by discrete parts, there is problem that the mounting area comes to be large.

(c) In case it is built in the LSI (Large Scale Integrated Circuit), there are problems that the circuit scale is made large, and the user usage domain comes to be narrow.

The present invention is performed taking into account problems as described above, in case a large amplitude signal is input or even in case a contour emphasizing quantity is "large", can display a contour emphasizing video without white crushing or black crushing by the display device driven by a digital video signal, as well as realizes a contour emphasizing circuit enabling the limiting of 1 piece of line memory required by the contour extracting circuit.

DISCLOSURE OF THE INVENTION

The contour emphasizing circuit according to the present invention is characterized by being provided with an A/D conversion circuit for converting analog color video signals (for example, R, G and B signals) to digital color video signals, a phase adjustment circuit to delay an output signal of this A/D conversion circuit in the portion of 1 line, a first signal generation circuit generating a Y signal from an output signal of the A/D conversion circuit, a second Y signal generation circuit generating a Y signal from an output signal of the phase adjustment circuit, a contour extracting circuit for extracting a vertical contour component and a horizontal contour component from Y signals generated by the first and second Y signal generation circuits and a contour adder to add a vertical contour component and a horizontal contour component extracted by this contour extracting circuit to an output signal of the phase adjustment circuit and to output digital color video signals contour-emphasized. Since a Y signal is generated after converting analog video signals to digital signals by the A/D conversion circuit, and contour components extracted from this Y signal are added to digital color video signals output from the phase adjustment circuit, the contour emphasizing component does not surpass the dynamic range of the A/D conversion circuit as the case in FIG. 1. For this reason, in case analog color video signals input to the contour emphasizing circuit of the present invention are large amplitude signals, or even when the contour emphasizing quantity is "large", neither white crushing nor black crushing is produced when a contour emphasizing video is displayed for output signals from the contour emphasizing circuit of the present invention to the display device driven by digital video signals.

Further, it has been designed that the first Y signal generation circuit generates a Y signal from an output signal of the A/D conversion circuit, the second Y signal generation circuit generates a Y signal from a signal delayed in the portion of 1 line by the phase adjustment circuit, the contour extracting circuit extracts a vertical contour component and a horizontal contour component from Y signals generated by first and second signal generation circuits, making it possible to reduce 2 line memories required to 1 line memory in the contour extracting circuit 38 in FIG. 3.

Hence, to simplify the circuit configuration of the contour extracting circuit and contour emphasizing frequency setting circuit, the contour extracting circuit is constituted by a line memory, a vertical contour extracting circuit, a contour emphasizing frequency setting circuit, a horizontal contour extracting circuit and a contour synthesis circuit, constituted by four 1-dot delay elements connected in series, for this contour emphasizing frequency setting circuit a 2-dot delay Y signal is output from the output side of the second 1-dot delay element, and a 4-dot delay Y signal is output from the output side of the fourth 1-dot delay element.

Further, to eliminate a noise influence, in the contour extracting circuit, a core ring circuit for suppressing a contour component of less than a certain level is set.

Further, to make the contour emphasizing quantity large, a gain controller for adjusting the size of contour component extracted by the contour extracting circuit and a coefficient multiplication circuit outputs to the contour adder after multiplying coefficients Kr, Kg and Kb of less than 1 to its output signal.

BEST MODE TO REALIZE THE INVENTION

Below, the present invention in detail will be explained on the basis of the attached drawings.

Figure 3:
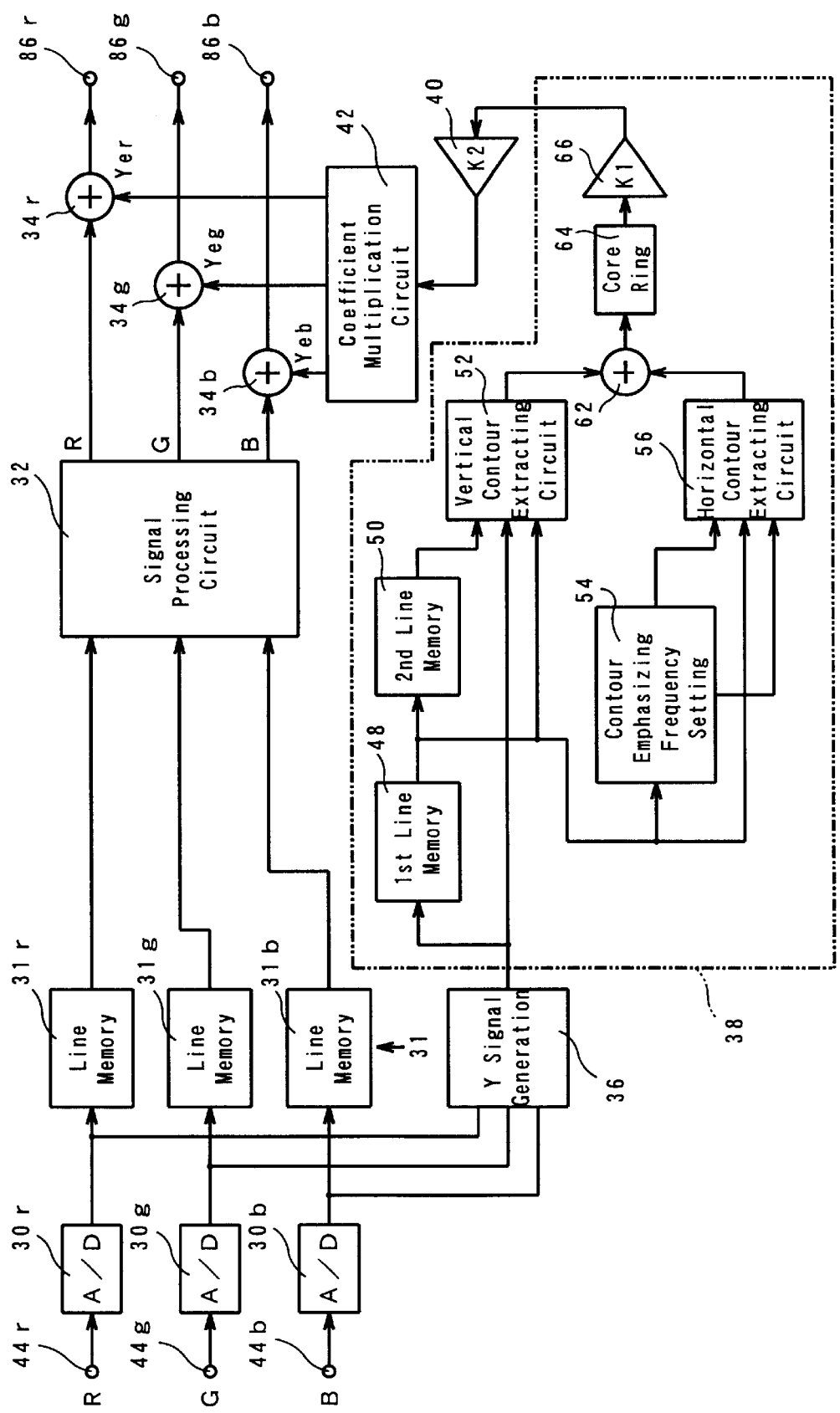
FIG. 3 is a block diagram of the contour emphasizing circuit proposed as a separate application.
Figure 4:
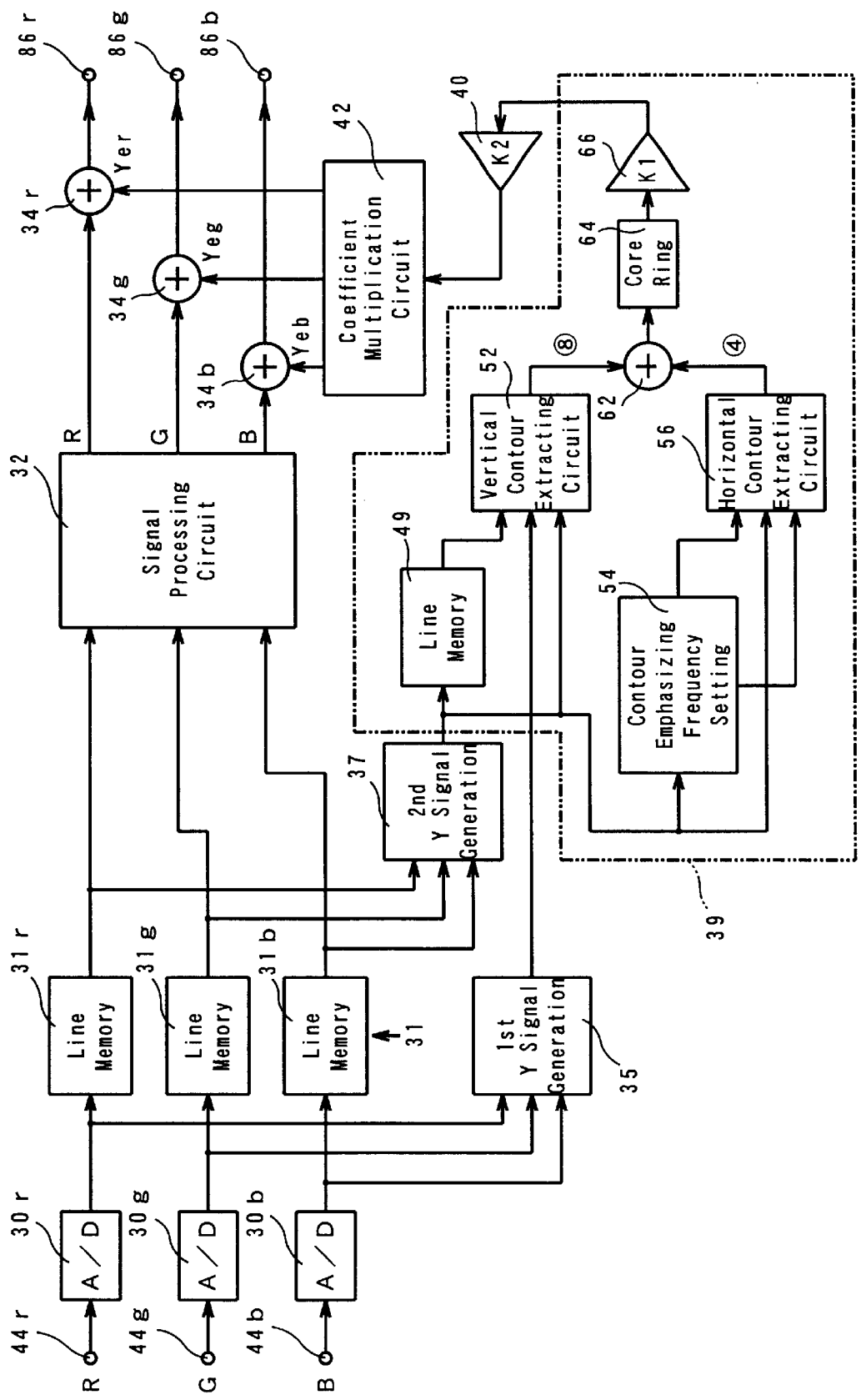
FIG. 4 is a block diagram showing an embodiment of the contour emphasizing circuit according to the present invention.

FIG. 4 shows an embodiment of the present invention and the same elements in FIG. 3 have the identical code. In this FIG. 4, 30r, 30g and 30b are A/D conversion circuits, 31 is a phase adjustment circuit, 32 is a signal processing circuit, 34r, 34g and 34b are contour adders, 35 is a first Y signal generation circuit, 37 is a second Y signal generation circuit, 39 is a contour extracting circuit, 40 is a gain controller of the contour component and 42 is a coefficient multiplication circuit.

Said A/D conversion circuits 30r, 30g and 30b are constituted by converting for output analog R, G and B signals input in input terminals 44r, 44g and 44b to digital R, G and B signals of 8 bits resolution, respectively.

Said phase adjustment circuit 31 consists of line memories for r, G and B 31r, 31g and 31b, and these line memories 31r, 31g and 31b are constituted by generating for output signals delayed in the portion of 1 line (portion of 1 scanning line) of R, G and B signals output from said A/D conversion circuits 30r, 30g and 30b, respectively.

Said signal processing circuit 32 is constituted by carrying out for output signal processing like picture element number conversion, gamma correction, etc. to R, G, B signals output from said line memories 31r, 31g and 31b. Said picture element number conversion processing expresses, in proportion as the displayed picture element number of display device, an action to carry out the rate conversion of sample number of 8-bits digital R, G and B signals, and said gamma correction expresses the processing to correct the light emitting characteristic of the display device.

Said first Y signal generation circuit 35 is constituted so to generate Y (luminance) signals from digital R, G and B signals output from A/D conversion circuits 30r, 30g and 30b. Said second Y generation circuit 37 is constituted so to generate Y signals from R, G and B signals of 1-line delay output from the phase adjustment circuit 31.

Said first and second Y signal generation circuits 35 and 37, for example, use a ROM (Read Only Memory) as a LUT (Look Up Table) function, realized by the method to obtain Y signals by adding R, G and B signals with a mixture ratio provided by the NTSC (National Television System Committee) so as to satisfy equation (5) or by the method to obtain an approximate value of the Y signal to satisfy equation (6) by means of the bit shift addition as shown in FIG. 4.

$$Y=(0.3 \times R)+(0.5 \times G)+(0.11 \times B) \quad (5)$$

$$Y=0.31 \times R+0.5625 \times G+0.1250 \times B \quad (6)$$

Figure 6:
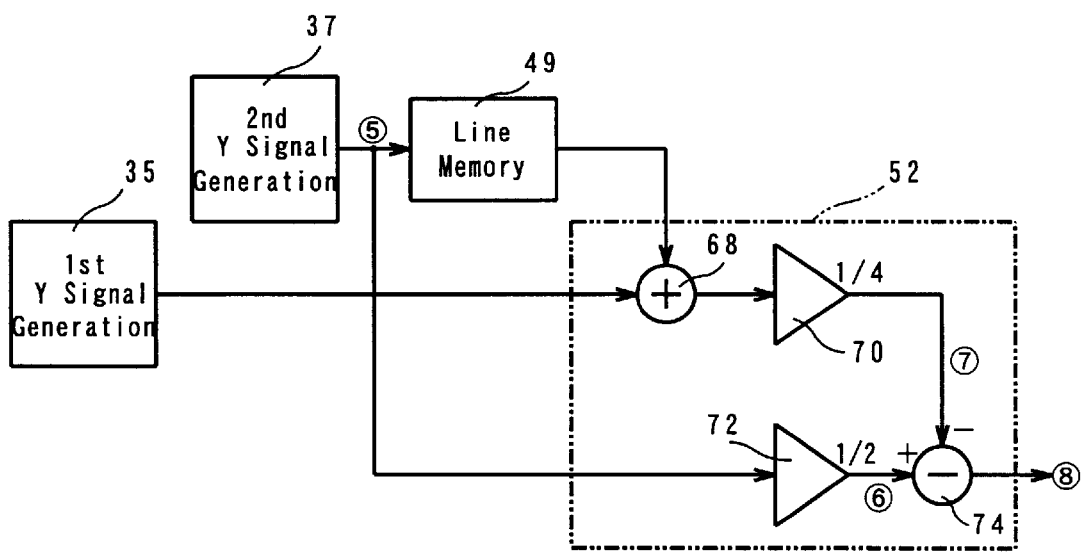
FIG. 6 is a block diagram showing an example of the vertical contour component extracting circuit in FIG. 4.
Figure 7:
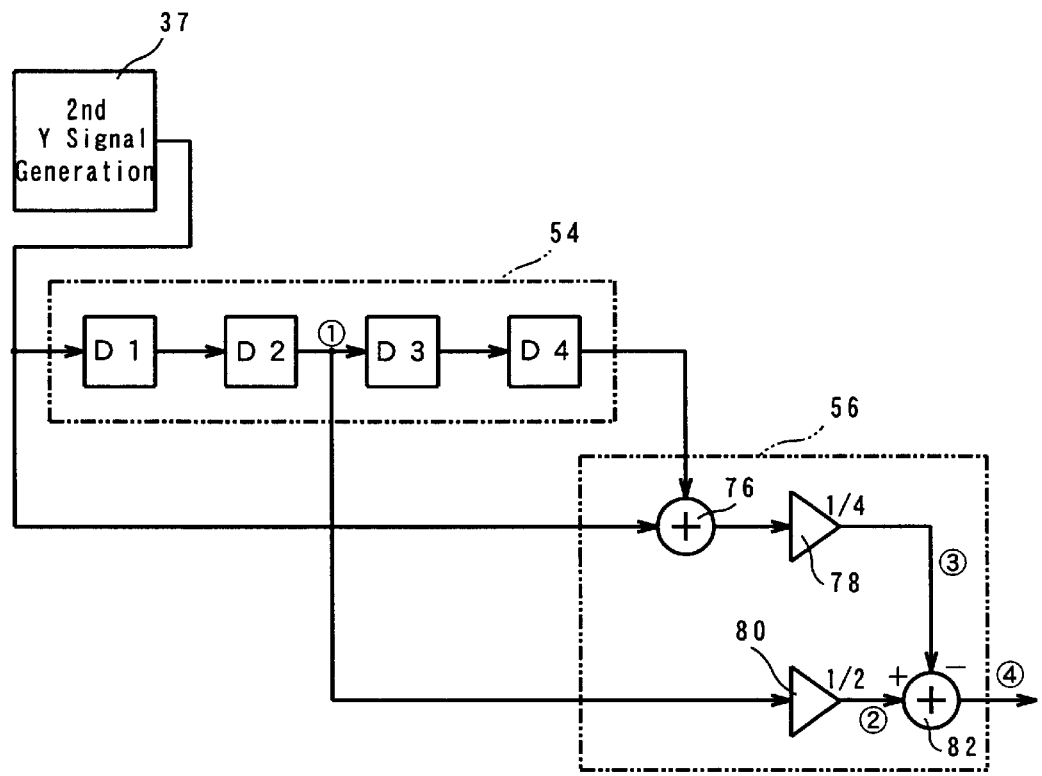
FIG. 7 is a block diagram showing an example of the contour emphasizing frequency setting circuit and horizontal contour extracting circuit in FIG. 4.

Said contour extracting circuit 39 is constituted to extract for output contour components from the Y signals generated by said first and second Y signal circuits 35 and 37, and specifically is constituted as shown in FIGS. 4, 6 and 7.

In FIG. 4, 49 is a line memory, 52 is a vertical extracting circuit, 54 is a contour emphasizing frequency setting circuit, 56 is a horizontal contour extracting circuit, 62 is a contour synthesis circuit, 64 is a core ring circuit, and 66 is a gain controller.

Said line memory 49 is constituted to generate so for output a Y signal delayed in the portion of 1 line (portion of 1 scanning line) by the Y signal generated by said second Y signal generation circuit 37. Said vertical contour extracting circuit 52 consists of, as shown in FIG. 6, an adder 68 adding for output a Y signal generated by said first Y signal generation circuit 35 and a Y signal of 2-line delay output from said line memory 49, a multiplier 70 multiplying for output a coefficient (¼) to an output signal of this adder 68, a multiplier 72 multiplying for output a coefficient (½) to a Y signal of 1-line delay output from said second Y signal generation circuit 37 and a subtracter 74 to subtract an output signal of said multiplier 70 from an output signal of said multiplier 72.

Said contour emphasizing frequency setting circuit 54 is a circuit to set the contour emphasizing frequency to the specified frequency (for example, ½ of sampling frequency Fs), specifically, as shown in FIG. 7, and constituted by the 5-tap type composed of four 1-dot delay elements D1 through D4 to delay Y signals generated by said second Y signal generation circuit 37 gradually in the portion of 1 dot (portion of 1 picture element). Each of said 1-dot delay elements D1 through D4 is, for example, constituted by D-FF (D type flip flop), respectively. In this connection, said contour emphasizing frequency setting circuit 54 is not limited to the 5-tap type, and the 7-tap type composed of six 1-dot delay elements D1 through D6 connected in series may be used.

Said horizontal contour extracting circuit 56 consists, as shown in FIG. 7 of an adder 76 to add a Y signal generated by said second Y signal generation circuit and a Y signal of 4-dot delay output from the fourth 1-dot delay element D4 of said contour emphasizing frequency setting circuit, a multiplier 78 to multiply for output a coefficient (¼) to an output signal of this adder 76, a multiplier 80 to multiply for output a coefficient (½) to a Y signal of 2-dot delay output from the second 1-dot delay element D2 and a subtracter 82 to subtract an output signal of said coefficient device 78 from an output signal of said coefficient device 80.

Said contour synthesis circuit 62 synthesizes for output a vertical contour component extracted by said vertical contour extracting circuit 52 and a horizontal contour component extracted by said horizontal contour extracting circuit 56.

Figure 8:
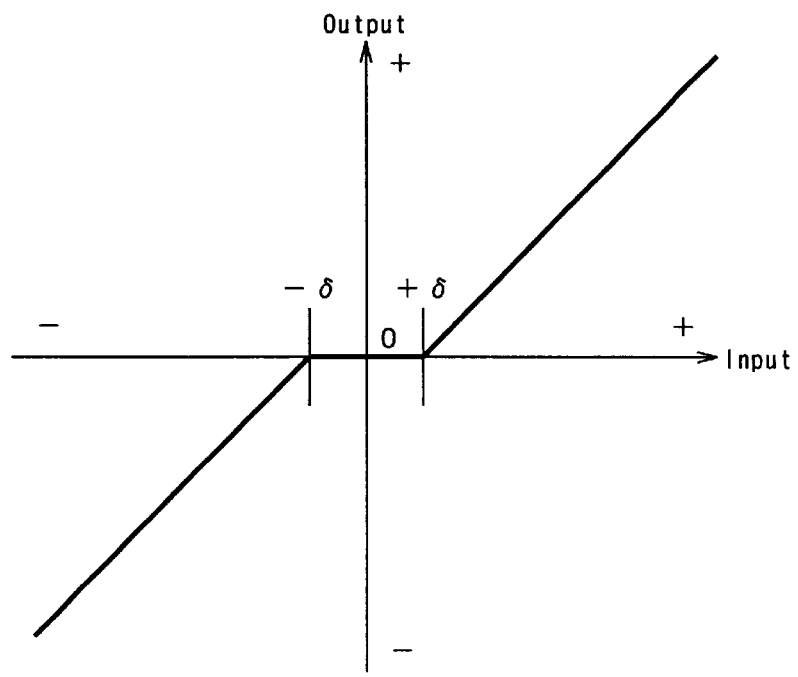
FIG. 8 is a characteristic drawing of the core ring in FIG. 4.

Said core ring circuit 64 eliminates a noise and minute contour component of a contour component output from said contour synthesis circuit 62 and suppresses for output a contour component of less than a certain level of this contour component. Said core ring circuit 64 is, for example, constituted so as to possess the input-output characteristics shown in FIG. 8. Specifically, when a contour component input from the contour synthesis circuit 62 is positive and larger than 0, −δ (δ is a positive constant) is added for output to the original component, and when it is negative and smaller than 0, +δ is added for output to the original component, as well, the output is 0 when its operation result is larger than δ and less than δ.

Said gain controller 66 multiplies an adjustable coefficient K1 to a contour component from said core ring circuit 64.

Said gain controller 40 multiplies an adjustable coefficient K2 to a contour component from said contour extracting circuit 39.

Said gain controllers 66 and 40 may omit one side (for example 66) as need arises.

Figure 5:
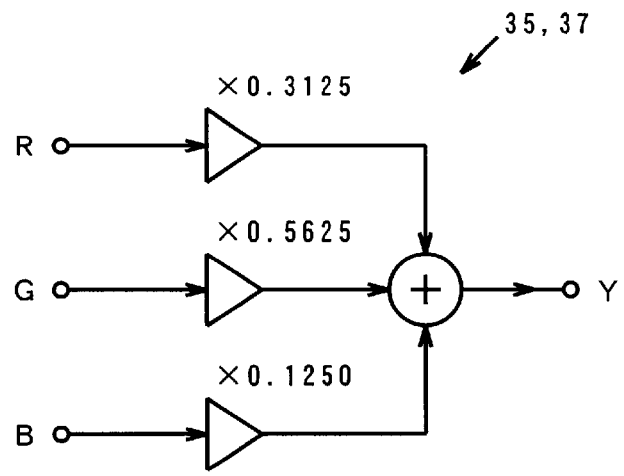
FIG. 5 is a block diagram showing an example of first and second Y signal generation circuits in FIG. 4.
Figure 9:
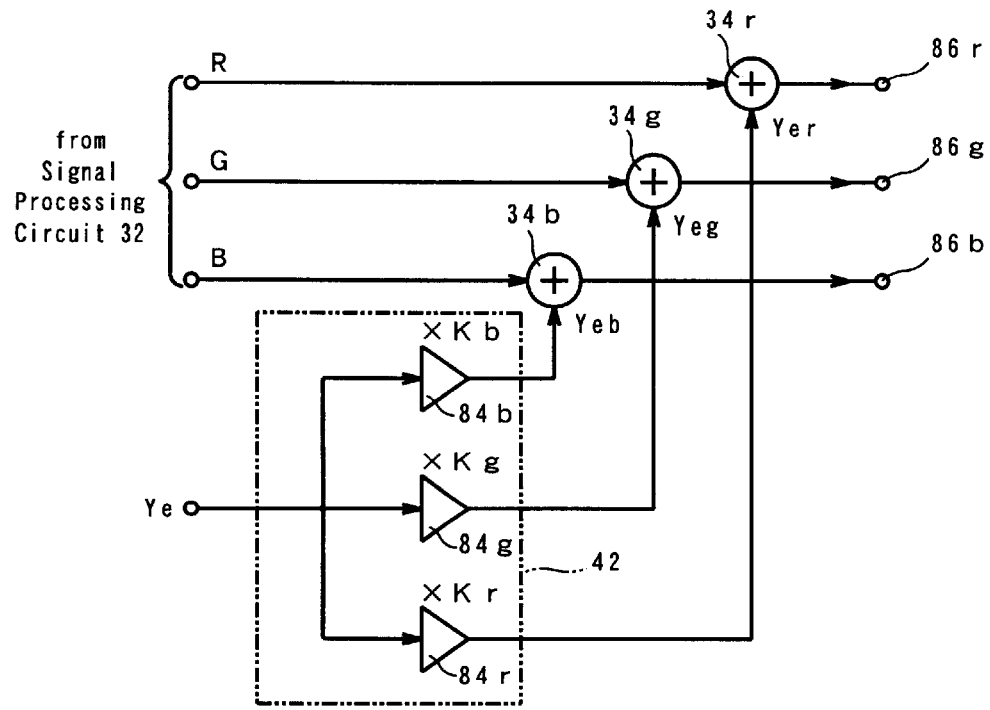
FIG. 9 is a block diagram showing an example of the coefficient multiplication circuit in FIG. 4.

Said coefficient multiplication circuit 42 is, as shown in FIG. 9, constituted by multipliers 84r, 84g and 84b to output contour components Yer, Yes and Yeb for R, G and b by multiplying coefficients Kr, Kg and Kb to a contour component Ye output from said gain controller 40. Said coefficients Kr, Kg and Kb are not limited to this, but are obtained by the bit shift addition, by setting the values of 0.3125, 0.5625 and 0.125 (Kr+Kg+Kb) as the coefficients of R, G and B (FIG. 5) employed by said second signal generation circuits 35 and 37 to generate Y signals.

Said contour adders 34r, 34g and 34b adds contour components Yer, Yeg and Yeb output from coefficient devices 84r, 84g and 84b of said coefficient multiplication circuit 42, and outputs to the display device (for example, display devices of PDP, LCD, etc., hereinafter similar) through output terminals 86r, 86g and 86b.

Next, the functions will be explained.

(1) In FIG. 4, analogs R, G and B signals input to input terminals 44r, 44g and 44b are converted to 8-bits digital R, G and B signals by A/D conversion circuits 30r, 30G and 30b, delayed in the portion of 1 line by line memories 31r, 31*g* and 31*b* of the phase adjustment circuit 31, signal-processed by the signal processing circuit 32, and input in the input side of one side of contour adders 34*r*, 34*g* and 34*b*.

(2) The first Y signal generation circuit 35 generates Y signals from digital R, G and B signals output from A/D conversion circuits 30*r*, 30*g* and 30*b*, and the second Y signal generation circuit 37 generates Y signals from digital R, G and B signals of 1-line delay output from line memories 31*r*, 31*g* and 31*b* of the phase adjustment circuit. For example, these first and second Y signal generation circuits 35 and 37 generate Y signals from digital R, G and B signals by bit shift addition to employ the circuit in FIG. 5.

(3) The contour extracting circuit 39 extracts contour components from Y signals generated by first and second Y signal generation circuits. Next, the extracting functions of a contour component by this contour extracting circuit 39 will be explained by reference to FIG. 4.

(3a) Referring to FIGS. 7 and 10, the function to extract a horizontal contour component as a high-pass component in the horizontal direction of a Y signal will be explained.

Figure 10:
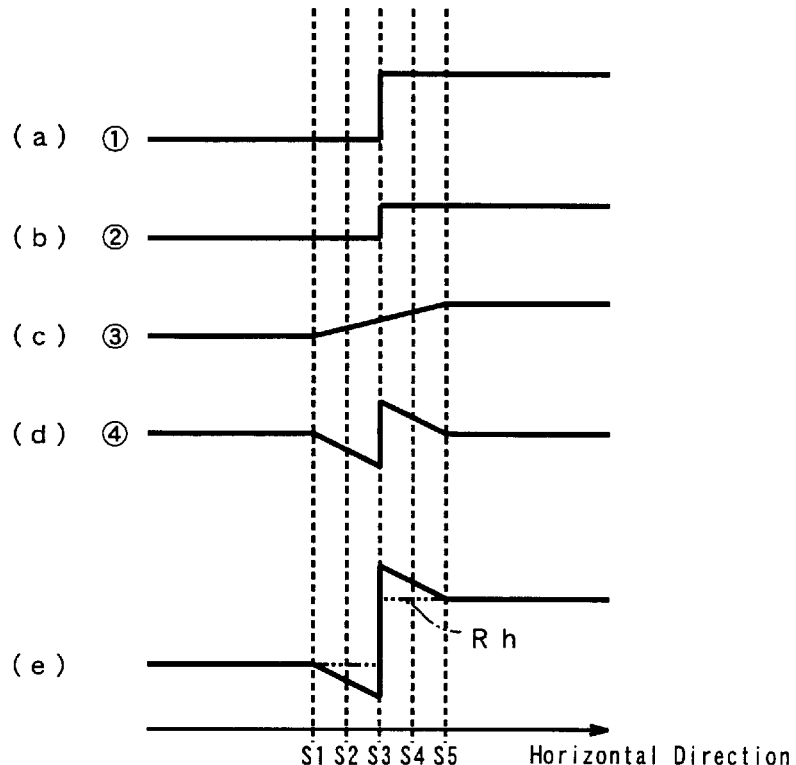
FIG. 10 shows signal waveforms relating to the contour emphasis in the horizontal direction; (a) is a waveform drawing of signal (1) (Y signal) in FIG. 4, (b) is a waveform drawing of signal (2) in FIG. 7, (c) is a waveform drawing of signal (3) in FIG. 7, (d) is a waveform drawing of signals (4) in FIGS. 4 and 7, and (e) is a waveform drawing of the component in the horizontal direction of the signals output to the output terminal 86r in FIG. 4.

Vertical lines S1, S2, S3, S4 and S5 expressed by dotted lines in FIG. 10 expresses sampling points of each picture element successively in the horizontal direction along the scanning line including picture elements as the object of the processing.

When a Y signal output from the second 1-dot delay element D2 of the contour emphasizing frequency setting circuit 54 is made to (1) as shown in (a) in FIG. 10, a signal (2) output from the multiplier 80 of the horizontal contour extracting circuit 56 is made as shown in the same figure (b), and enters in the + side of the subtracter 82.

A Y signal output from the second Y signal generation circuit and a Y signal output from the fourth 1-dot delay element D4 of the contour emphasizing frequency setting circuit 54 are added by the adder 76 of the horizontal contour extracting circuit, multiplied by ¼ by the multiplier 78, and as shown in (c) in FIG. 10, enters in the − side of the subtracter 82 as a signal (3). Signals operated by this subtracter 82 ((2) and (3)) enter in the input side of one side of the contour synthesis circuit 62 as a signal (4) as shown in (d) in FIG. 10.

(3b) Referring to FIGS. 6 and 11, the function of extracting a vertical contour component as a high-pass component in the vertical direction of a Y signal will be explained.

Figure 11:
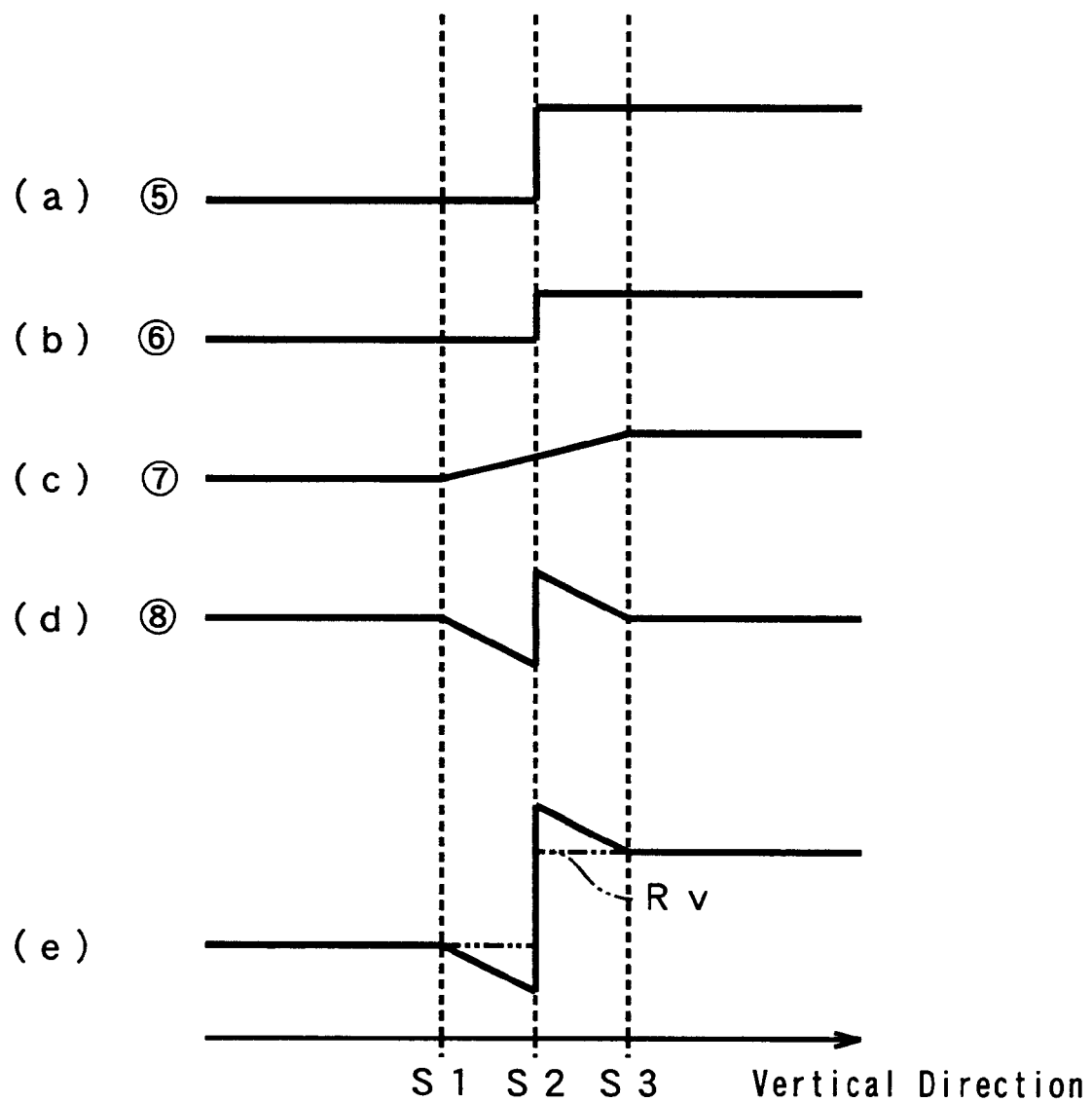
FIG. 11 shows signal waveforms relating to a contour emphasis in the vertical direction; (a) is a waveform drawing of signal (5) (Y signal) in FIG. 6, (b) is a waveform drawing of signal (6) in FIG. 6, (c) is a waveform drawing of signal (7) in FIG. 6, (d) is a waveform drawing of signals (8) in FIGS. 4 and 6, and (e) is a waveform drawing of the component in the vertical direction of signals output to the output terminal 86r in FIG. 4.

Vertical lines S1, S2 and S3 expressed by dotted lines in FIG. 11 are picture elements on three scanning lines; a scanning line and back and forward scanning lines including picture elements as the object of the processing, and express sampling points of three picture elements in order along the vertical direction including picture elements as the object of the processing.

If a Y signal of 1-line delay output from the second Y signal generation circuit 37 is made to (5) as shown in (a) in FIG. 11, a signal (6) output from the multiplier 72 of the vertical contour extracting circuit is made as shown in the same figure (b), and input to the + side of the subtracter 74.

A Y signal output from the first Y signal generation circuit 36 and a Y signal of 2-line delay output from the line memory 49 are added by the adder 68 of the vertical contour extracting circuit, multiplied by ¼ by the multiplier 79, and as shown in (c) in FIG. 11, input to the − side of the subtracter 74 as a signal (7). Signals ((6) and(7)), and operated by this subtracter 74, which input to the input side of the contour synthesis circuit 62 a signal (8) as shown in (d) in FIG. 11.

(3c) A signal (4) expressing a horizontal contour component extracted by the horizontal contour extracting circuit 56 and a signal (8) expressing a vertical contour component extracted by the vertical contour extracting circuit 52 are synthesized by the contour synthesis circuit 62, contour components of less than a certain level are suppressed by the core ring circuit 64 to eliminate noise influence, and multiplied by a coefficient K1 by the gain controller 66 and level adjusted.

(4) The contour component output from the contour extracting circuit 39 is level adjusted by being multiplied by a coefficient K2 by the gain controller 40, become contour components Yer, Yeg and Yeb for R, G and B after being multiplied by coefficients Kr, Kg and Kb by multipliers 84*r*, 84*g* and 84*b* of the coefficient multiplication circuit 42, and input into another input side of the corresponding contour adders 34*r*, 34*g* and 34*b*. For this reason, the contour emphasizing quantity can be made large.

(5) R, G and B signals signal-processed by the signal processing circuit 32 and contour components Yer, Yeg and Yeb for R, G and B output from multipliers 84*r*, 84*g* and 84*b* of the coefficient multiplication circuit 42 are added by contour adders 34*r*, 34*g* and 34*b*, output to the display device through output terminals 86*r*, 86*g* and 86*b*, and the video contour-emphasized by this display device is displayed.

At this time, the horizontal direction component of (R+Yer) signals output to the output terminal 86*r* becomes as shown in (e) in FIG. 10, and the vertical direction component becomes as shown in (e) in FIG. 11. Rh and Rv shown by two-dot chain lines in (e) in FIGS. 10 and 11 express the horizontal direction component and vertical direction component of a R signal output from the signal processing circuit 32.

Likewise, both the horizontal direction component and vertical direction component of (G+Yeg) and (B+Yeb) output to output terminals 86*g* and 86*b* become similar to the horizontal direction component and vertical direction component of (R+Yer) signals output to the output terminal 86*r*.

Figure 1:
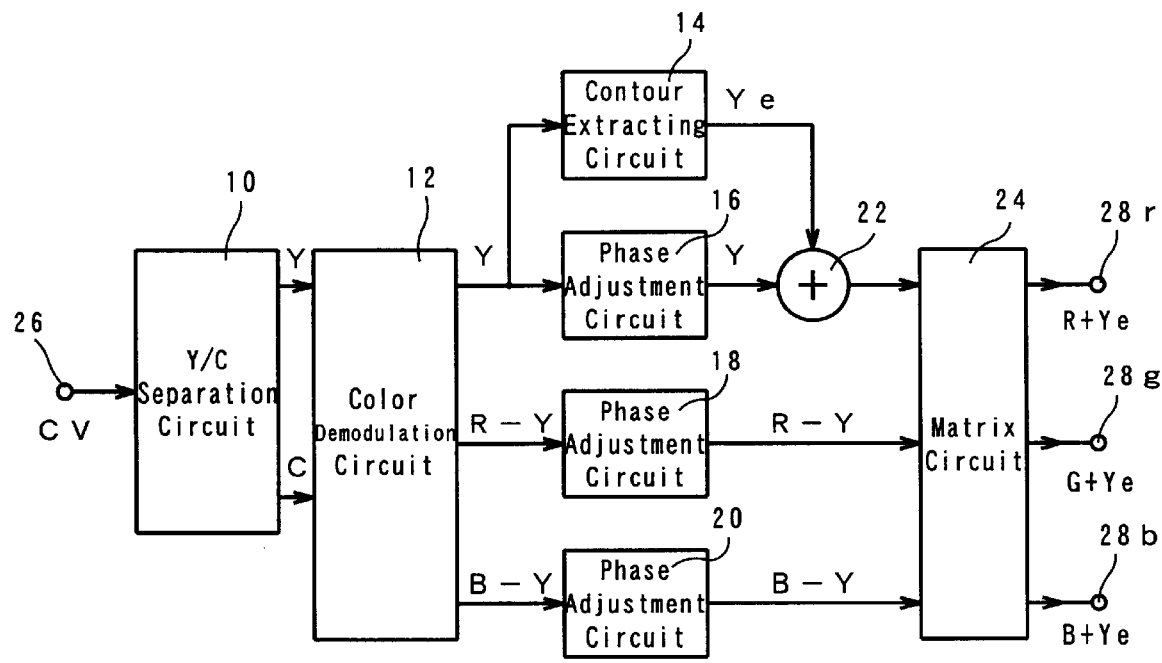
FIG. 1 is a block diagram showing a contour emphasizing circuit of the conventional example.
Figure 2:
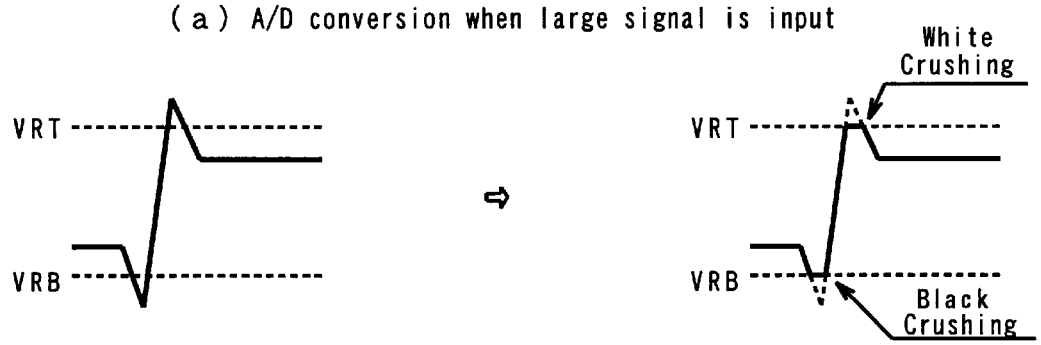
FIG. 2 shows the problems when signals obtained in the circuit in FIG. 1 A/D convert and output to the display device driven by digital video signals; (a) is a figure showing that neither white crushing nor black crushing is produced when large amplitude signals are input, (b) is a figure showing that neither white crushing nor black crushing is produced when the contour emphasizing quantity is "large".
Figure 2:
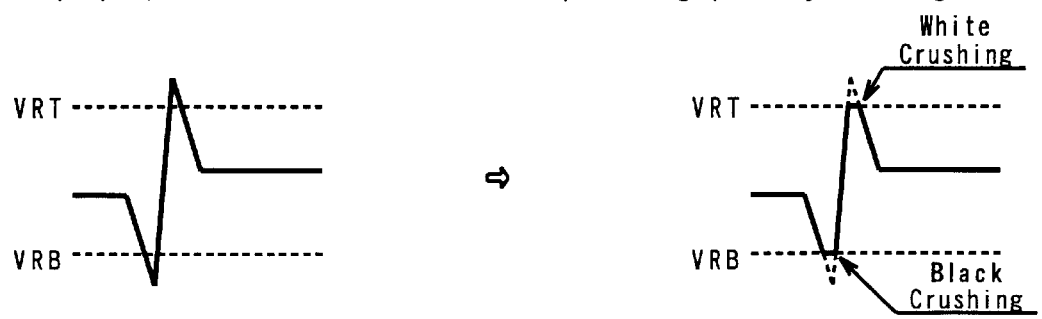

(6) As described above, since it is designed that the Y signals be generated by first and second signal generation circuits 35 and 37 after converting analog R, G and B signals to digital R, G and B signals by A/D conversion circuits 30*r*, 30*g* and 30*b* and contour components extracted from these Y signals be added to the original digital R, G and B signals, the contour emphasizing component like the conventional example shown in FIG. 1 does not surpass the dynamic range of the A/D conversion circuit. For this reason, in case analog R, G and B signals input to input terminals 44*r*, 44*g* and 44*b* of the contour emphasizing circuit of the present invention are large amplitude signals or even when the contour emphasizing quantity is "large", neither white crushing nor black crushing is produced when outputting signals from the contour emphasizing circuit of the present invention to the display device (for example, dot matrix type display device) driven by digital R, G and B signals.

(7) Further, since it has been designed that the first signal generation circuit 35 generates Y signals from the output signals of A/D conversion circuits 30*r*, 30*g* and 30*b*, and the contour extracting circuit 39 extracts a vertical contour component and a horizontal contour component from Y signals generated by first and second Y signal generation circuits 35 and 37, the 2 line memories required in the contour extracting circuit 38 in FIG. 3 can be replaced by 1 line memory by eliminating a line memory. For this reason, it has the following effects:

(a) In comparison with the proposed example in FIG. 3, the number of Y signal generation circuits is increased, but since the number line memories can be reduced, the power consumption can be made smaller, as well the cost can be reduced. That is to say, increasing the number of Y signal generation circuits can be configured by a minority of gates (for example, approximately 900 pieces more or less), however, since reducing the number of line memories require a number of gates (for example, line memory of 1024×8 bits of memory capacity approximately 12,700 pieces more or less), the power consumption can be made smaller, as well the cost being reduced.

(b) When it is accomplished by discrete parts, the mounting area can be made smaller.

(c) When it is built in an LSI, the circuit scale can be made smaller, and the user usage domain can be widened.

In the embodiment shown in FIG. 4, it is made so that the contour emphasizing quantities of R, G and B can be made larger by being multiplied the gain controller 40 to adjust for output the size of the contour component extracted by the contour extracting circuit 39 and coefficients Kr, Kg and Kb (Kr+Kg+Kb=1) of less than 1 are multiplied to its output signal into the coefficient multiplication circuit 42 and output to contour adders 34r, 34g and 34b, but the present invention is not limited to this, and can be designed to omit the gain controller 40 and the coefficient multiplication circuit 42, and to output the output of the contour extracting circuit 38 directly to contour adders 34r, 34g and 34b.

In the embodiment shown in FIG. 4, the noise influence is eliminated by installing the core ring circuit 64 for suppressing less than a certain level of the contour component output from the contour synthesis circuit 62, but the present invention is not limited to this, and the core ring circuit 64 can be omitted.

INDUSTRIAL AVAILABILITY

As above, the contour emphasizing circuit according to the present invention can be utilized to display a video of high picture quality, contour-emphasized on the basis of the input of analog color video signals, by a display device (for example, matrix type display device) driven by digital color video signals like PDP, LCD, etc. Further, with regard to the contour extracting circuit of the contour emphasizing circuit, by making the line memory only 1 line memory, low power consumptions results and a lowering in cost can be obtained.

What is claimed is:

1. A contour emphasizing circuit comprising an A/D conversion circuit for converting input analog color video signals to output digital color video signals, a phase adjustment circuit for delaying by one line the output digital color video signals, a signal processing circuit for processing the delayed output digital color video signals, a first Y signal generation circuit for generating a Y signal from the output digital color video signals, a second Y signal generation circuit for generating a Y signal from the delayed output digital color video signals, a contour extracting circuit for extracting a vertical contour component and a horizontal contour component of the Y signals generated by the first and second Y signal generation circuits and contour adders for adding vertical and horizontal contour components extracted by the contour extracting circuit to the processed delayed output digital color video signals and produce contour-emphasized digital color video signals, wherein the contour extracting circuit comprises a line memory for delaying by one line the Y signal generated by the second Y signal generation circuit, a vertical contour extracting circuit for extracting a vertical component on the basis of the Y signals generated by the first and second Y signal generation circuits and the Y signal delayed by the line memory, a contour emphasizing frequency setting circuit comprising n 1-dot delay elements connected in series for generating two kinds of delayed Y signals consisting of an n-dot delayed Y signal from the $n^{th}$ 1-dot delay element and a 2-dot delayed signal from the second 1-dot delay element for contour emphasizing frequency setting, based on a Y signal generated by said second Y signal generation circuit and n being at least four, a horizontal contour extracting circuit for extracting a horizontal contour component on the basis of the Y signal generated by said second Y signal generation circuit and the two kinds of delayed Y signals and a contour synthesis circuit for synthesizing output contour components from said vertical and horizontal extracting circuits, respectively.

2. The contour emphasizing circuit of claim 1, wherein the A/D circuit converts analog R, G and B signals to digital R, G and B signals and the contour emphasizing circuit additionally comprises a gain controller for receiving contour components extracted by the contour extracting circuit, multiplying the contour components by an adjustable coefficient and outputting adjusted contour components, a coefficient multiplication circuit for receiving the output of the gain controller, multiplying by coefficients Kr, Kg and Kb and outputting contour components for the digital R, G and B signals and the contour adders for adding the contour components for the digital R, G and B signals to the digital R, G and B signals.

3. The contour emphasizing circuit of claim 1, wherein the contour emphasizing frequency setting circuit comprises four 1-dot delay elements connected in series and outputs the 2-dot delay Y signal from the second 1-dot delay element and a 4-dot delay Y signal form the fourth 1-dot delay element.

4. The contour emphasizing circuit of claim 1, wherein the contour extracting circuit comprises a core ring circuit for suppressing contour components of less than a specified level from being outputted.

5. The contour emphasizing circuit of claim 1, wherein said signal processing circuit performs picture element number conversion, gamma correction and phase adjustment on the delayed output digital color video signals.

* * * * *